US012346060B2

(12) United States Patent
Otsuka et al.

(10) Patent No.: US 12,346,060 B2
(45) Date of Patent: Jul. 1, 2025

(54) DEVELOPING DEVICE, PROCESS CARTRIDGE, AND IMAGE FORMING APPARATUS

(71) Applicants: Taira Otsuka, Kanagawa (JP); Hiroshi Hosokawa, Kanagawa (JP); Kazuki Matsumoto, Kanagawa (JP); Hiroyuki Sugiyama, Kanagawa (JP)

(72) Inventors: Taira Otsuka, Kanagawa (JP); Hiroshi Hosokawa, Kanagawa (JP); Kazuki Matsumoto, Kanagawa (JP); Hiroyuki Sugiyama, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 18/591,024

(22) Filed: Feb. 29, 2024

(65) Prior Publication Data

US 2024/0302790 A1 Sep. 12, 2024

(30) Foreign Application Priority Data

Mar. 7, 2023 (JP) ................................ 2023-034986

(51) Int. Cl.
*G03G 21/20* (2006.01)
*G03G 15/08* (2006.01)
*G03G 21/18* (2006.01)

(52) U.S. Cl.
CPC ......... *G03G 21/20* (2013.01); *G03G 15/0865* (2013.01); *G03G 15/0891* (2013.01);
(Continued)

(58) Field of Classification Search
CPC ............... G03G 21/20; G03G 15/0865; G03G 15/0891; G03G 21/1814; G03G 21/206;
(Continued)

(56) References Cited

U.S. PATENT DOCUMENTS 3,955,235 A * 5/1976 Meyer .................... G03G 21/10
399/350
4,377,334 A * 3/1983 Nishikawa ......... G03G 15/0942
399/279
(Continued)

FOREIGN PATENT DOCUMENTS

JP 61140968 A * 6/1986
JP 2005084564 A * 3/2005
(Continued)

*Primary Examiner* — Arlene Heredia
*Assistant Examiner* — Laura Roth
(74) *Attorney, Agent, or Firm* — XSENSUS LLP

(57) ABSTRACT

A developing device includes a plurality of conveyance passages, an opening portion, and a filter. Developer is conveyed in the plurality of conveyance passages in a longitudinal direction of the developing device. The opening portion is disposed in one conveyance passage of the plurality of conveyance passages and communicates with an outside of the developing device. The filter is fitted in the opening portion and has both a collecting ability to collect the developer and a ventilation ability to ventilate the one conveyance passage to the outside of the developing device. The collecting ability of the filter is higher in a high-bulk portion in which bulk of the developer increases in the one conveyance passage than in a low-bulk portion in which the bulk of the developer decreases in the one conveyance passage. The ventilation ability of the filter is lower in the high-bulk portion than in the low-bulk portion.

10 Claims, 4 Drawing Sheets

(52) U.S. Cl.
CPC ..... *G03G 15/0893* (2013.01); *G03G 15/0896* (2013.01); *G03G 21/1814* (2013.01); *G03G 21/206* (2013.01); *G03G 2221/1645* (2013.01); *G03G 2221/1648* (2013.01)

(58) Field of Classification Search
CPC ........... G03G 15/0875; G03G 15/0889; G03G 2215/068; G03G 15/0893; G03G 15/0898; G03G 15/0896; G03G 2221/1645; G03G 2221/1648
See application file for complete search history.

(56) References Cited

U.S. PATENT DOCUMENTS

| | | | | | |
|---|---|---|---|---|---|
| 4,583,112 | A | * | 4/1986 | Morano | G03G 15/0898 399/103 |
| 4,800,411 | A | * | 1/1989 | Tanaka | G06T 9/005 399/267 |
| 5,887,227 | A | * | 3/1999 | Kawai | G03G 15/0126 399/119 |
| 6,212,343 | B1 | | 4/2001 | Hosokawa et al. | |
| 10,663,881 | B1 | * | 5/2020 | Wakai | G03G 15/0812 |
| 2004/0134560 | A1 | * | 7/2004 | Sato | G03G 15/0894 141/5 |
| 2004/0223782 | A1 | | 11/2004 | Hosokawa et al. | |
| 2010/0202805 | A1 | | 8/2010 | Miyoshi et al. | |
| 2011/0008073 | A1 | | 1/2011 | Kudo et al. | |
| 2014/0016960 | A1 | | 1/2014 | Miyoshi et al. | |
| 2014/0233984 | A1 | | 8/2014 | Miyoshi et al. | |
| 2014/0314451 | A1 | | 10/2014 | Hosokawa et al. | |
| 2016/0026116 | A1 | | 1/2016 | Hosokawa et al. | |
| 2016/0170328 | A1 | | 6/2016 | Hosokawa et al. | |
| 2017/0115597 | A1 | | 4/2017 | Kawashima et al. | |
| 2017/0115604 | A1 | | 4/2017 | Hosokawa et al. | |
| 2017/0115605 | A1 | | 4/2017 | Yoshida et al. | |
| 2017/0160675 | A1 | | 6/2017 | Kadota et al. | |
| 2019/0033749 | A1 | | 1/2019 | Tamaki et al. | |
| 2020/0096901 | A1 | * | 3/2020 | Noguchi | G03G 15/0896 |
| 2022/0107605 | A1 | * | 4/2022 | Hashikawa | B01D 46/56 |
| 2023/0168608 | A1 | * | 6/2023 | Chiba | G03G 15/0898 399/258 |
| 2023/0330582 | A1 | * | 10/2023 | Yabuta | G03G 21/206 |

FOREIGN PATENT DOCUMENTS

| | | | | |
|---|---|---|---|---|
| JP | 2009098209 | A | * | 5/2009 |
| JP | 2014-134671 | A | | 7/2014 |
| JP | 2022-174884 | A | | 11/2022 |

* cited by examiner

DEVELOPING DEVICE, PROCESS CARTRIDGE, AND IMAGE FORMING APPARATUS

CROSS-REFERENCE TO RELATED APPLICATION

This patent application is based on and claims priority pursuant to 35 U.S.C. § 119 (a) to Japanese Patent Application No. 2023-034986, filed on Mar. 7, 2023, in the Japan Patent Office, the entire disclosure of which is hereby incorporated by reference herein.

BACKGROUND

Technical Field

Embodiments of the present disclosure relate to a developing device to develop a latent image formed on an image bearer such as a photoconductor drum, a process cartridge including the developing device, and an image forming apparatus including the developing device.

Related Art

Some technologies are known that, in a developing device disposed in an image forming apparatus such as a copier or a printer, an opening is formed in a developing case of the developing device and is fitted in with a filter for the purpose of preventing toner scattering due to an increase of the internal pressure in the developing device.

SUMMARY

In an embodiment of the present disclosure, there is provided a developing device that develops a latent image formed on a surface of an image bearer and includes a plurality of conveyance passages, an opening portion, and a filter. Developer stored in the developing device is circulated and is conveyed in the plurality of conveyance passages in a longitudinal direction of the developing device. The opening portion is disposed in one conveyance passage of the plurality of conveyance passages and communicates with an outside of the developing device. The filter is fitted in the opening portion and has both a collecting ability to collect the developer and a ventilation ability to ventilate the one conveyance passage to the outside of the developing device. The collecting ability of the filter is higher in a high-bulk portion in which bulk of the developer increases in the one conveyance passage than in a low-bulk portion in which the bulk of the developer decreases in the one conveyance passage. The ventilation ability of the filter is lower in the high-bulk portion than in the low-bulk portion.

In another embodiment of the present disclosure, there is provided a process cartridge that is detachably attached to a body of an image forming apparatus and includes the developing device.

In still another embodiment of the present disclosure, there is provided an image forming apparatus that includes the developing device.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

Figure 1:
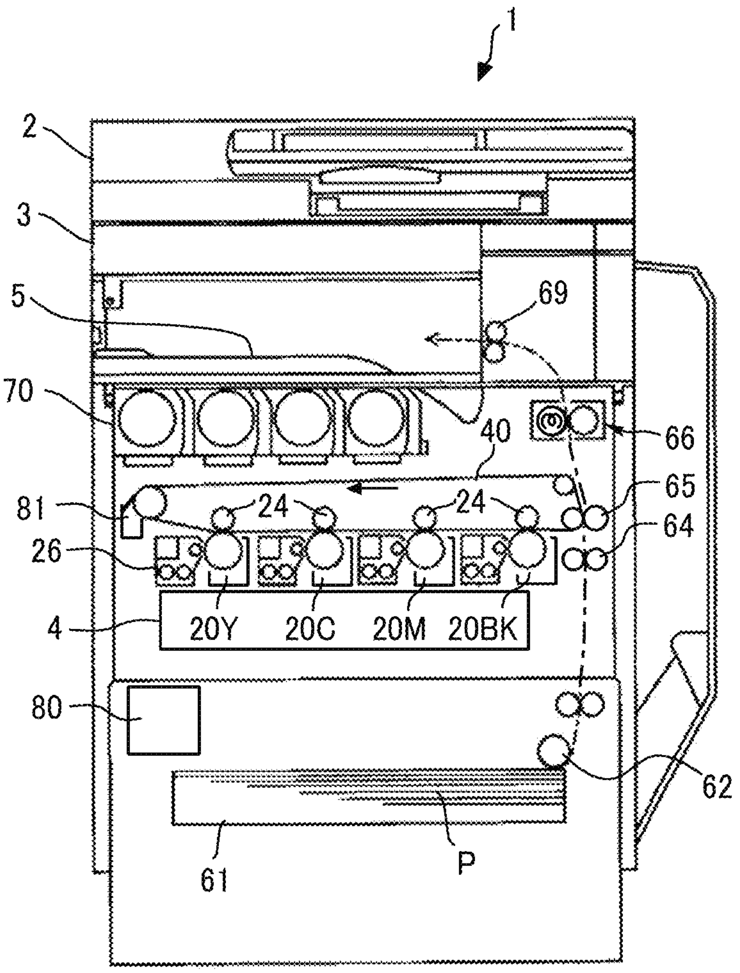
FIG. 1 is a diagram illustrating an overall configuration of an image forming apparatus according to an embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. Like reference signs are assigned to like elements and components and descriptions of those elements or components may be simplified or omitted. As used herein, the singular forms "a," "an," and "the" are intended to include the plural forms as well, unless the context clearly indicates otherwise.

First, with reference to FIG. 1, a description is given of an overall configuration and operation of an image forming apparatus 1 according to an embodiment of the present disclosure. The image forming apparatus 1 according to the present embodiment is a tandem-type multicolor image forming apparatus in which process cartridges 20Y, 20M, 20C, and 20BK are arranged in parallel to each other, facing an intermediate transfer belt 40. In each of the process cartridges 20Y, 20M, 20C, and 20BK, a developing device 26 (see FIG. 2) is disposed to face a photoconductor drum 21 serving as an image bearer.

In FIG. 1, the image forming apparatus 1, which is illustrated as a color copier in the present embodiment, includes a document conveying device 2, a document reading device 3, and a writing device 4 (exposure device). The document conveying device 2 conveys documents to the document reading device 3. The document reading device 3 scans image data of the documents. The writing device 4 emits a laser beam according to input image data. Yellow, magenta, cyan, and black toner images are formed on the surfaces of the photoconductor drums 21 of the process cartridges 20Y, 20M, 20C, and 20BK, respectively. The yellow, magenta, cyan, and black toner images on the photoconductor drums 21 are transferred onto the intermediate transfer belt 40 and superimposed. The image forming apparatus 1 further includes a sheet feeder 61, a secondary transfer roller 65, and a fixing device 66. The sheet feeder 61 stores sheets P such as paper sheets. The secondary transfer roller 65 transfers the toner images formed on the intermediate transfer belt 40 onto a sheet P. The fixing device 66 fixes an unfixed toner image on the sheet P. The image forming apparatus 1 still further includes toner containers 70, cleaning devices 23, an intermediate-transfer-belt cleaner 81, and a waste-toner container 80. The toner containers 70 supply toner of the four colors to the respective developing devices 26 of the process cartridges 20Y, 20M, 20C, and 20BK. The waste-toner container 80 collects, as waste toner, untranferred toner collected by the cleaning devices 23 (see FIG. 2) and the intermediate-transfer-belt cleaner 81.

Figure 2:
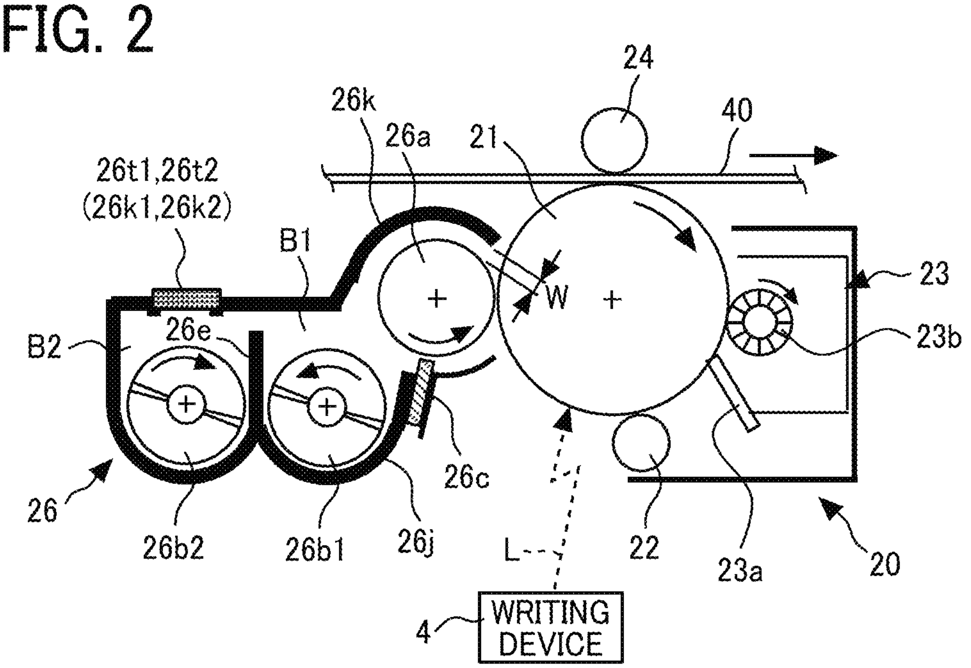
FIG. 2 is a cross-sectional view of an image forming device according to an embodiment of the present disclosure.

Each of the process cartridges 20Y, 20M, 20C, and 20BK includes the photoconductor drum 21 as an image bearer, a charging device 22, and the cleaning device 23, which are united as a single unit as illustrated in FIG. 2. Each of the process cartridges 20Y, 20M, 20C, and 20BK, which is expendable, is removed from a body of the image forming apparatus 1 and replaced with a new one when depleted in the body of the image forming apparatus 1. The developing device 26 is disposed to face the photoconductor drum 21 in each of the process cartridges 20Y, 20M, 20C, and 20BK. Each of the developing devices 26, which is expendable, is removed from the body of the image forming apparatus 1 and replaced with a new one when depleted in the body of the image forming apparatus 1. An operator may independently perform attachment and detachment operations of the developing device 26 with respect to the body of the image forming apparatus 1, and attachment and detachment operations of the process cartridges 20Y, 20M, 20C, and 20BK with respect to the body of the image forming apparatus 1, as different operations. In the process cartridges 20Y, 20M, 20C, and 20BK, the yellow, magenta, cyan, and black toner images are formed on the respective photoconductor drums 21 as the image bearers.

A description is given below of operations of the image forming apparatus 1 to form a normal color toner image. A conveying roller of the document conveying device 2 conveys a document from a document table onto an exposure glass of the document reading device 3. The document reading device 3 optically scans image data for the document on the exposure glass. The yellow, magenta, cyan, and black image data are transmitted to the writing device 4. The writing device 4 irradiates the surface of the photoconductor drums 21 (see FIG. 2) of the process cartridges 20Y, 20M, 20C, and 20BK with laser beams (as exposure light) L according to the yellow, magenta, cyan, and black image data, respectively.

Meanwhile, the four photoconductor drums 21 rotate clockwise as illustrated in FIGS. 1 and 2. The surface of the photoconductor drum 21 is uniformly charged at the position opposite the charging device 22 (a charging roller) (in a charging process). Thus, the surface of the photoconductor drum 21 is charged to a charging potential. When the charged surface of the photoconductor drum 21 reaches the position to receive the laser beam L emitted from the writing device 4, an electrostatic latent image is formed on the surface of the photoconductor drum 21 according to the image data (in an exposure process).

The laser beam L corresponding to the yellow image data is emitted to the surface of the photoconductor drum 21 in the process cartridge 20Y, which is the first from the left in FIG. 1 among the four process cartridges 20Y, 20M, 20C, and 20BK. A polygon mirror that rotates at high velocity directs the laser beam L for the yellow image data to the surface of the photoconductor drum 21 along an axial direction of the photoconductor drum 21 (i.e., the main scanning direction). Thus, an electrostatic latent image corresponding to the yellow image data is formed on the photoconductor drum 21 charged by the charging device 22. Similarly, the laser beam L corresponding to the cyan image data is emitted to the surface of the photoconductor drum 21 in the second process cartridge 20C from the left in FIG. 1, thus forming an electrostatic latent image corresponding to the cyan image data on the surface of the photoconductor drum 21. The laser beam L corresponding to the magenta image data is emitted to the surface of the photoconductor drum 21 in the third process cartridge 20M from the left in FIG. 1, thus forming an electrostatic latent image corresponding to the magenta image data on the surface of the photoconductor drum 21. The laser beam L corresponding to the black image data is emitted to the surface of the photoconductor drum 21 in the fourth process cartridge 20BK from the left in FIG. 1, thus forming an electrostatic latent image corresponding to the black image data on the surface of the photoconductor drum 21.

Then, the surface of the photoconductor drum 21 bearing the electrostatic latent image for each color reaches the position opposite the developing device 26. The developing device 26 supplies toner onto the surface of the photoconductor drum 21 and develops the electrostatic latent image on the photoconductor drum 21 into a toner image (in a development process). After the development process, the surface of the photoconductor drum 21 reaches the position opposite the intermediate transfer belt 40. Each of primary transfer rollers 24 is disposed at the position where the surface of the photoconductor drum 21 faces the intermediate transfer belt 40 such that the primary transfer roller 24 contacts an inner circumferential surface of the intermediate transfer belt 40. At the positions of the primary transfer rollers 24, the toner images on the photoconductor drums 21 are sequentially transferred to and superimposed on the intermediate transfer belt 40, forming a multicolor toner image thereon (in a primary transfer process).

After the primary transfer process, the surface of the photoconductor drum 21 reaches the position opposite the cleaning device 23. The cleaning device 23 collects the untransferred toner remaining on the photoconductor drum 21 (in a cleaning process). The untransferred toner collected in the cleaning device 23 passes through a waste-toner conveyance passage and is collected as waste toner in the waste-toner container 80. Subsequently, a residual potential of the surface of the photoconductor drum 21 is removed at the position opposite a discharging device. Thus, a series of image forming processes performed on the photoconductor drum 21 is completed.

Meanwhile, the surface of the intermediate transfer belt 40, onto which the single-color toner images on the photoconductor drums 21 are transferred and superimposed, moves in a direction indicated by an arrow in FIG. 1 and reaches the position opposite the secondary transfer roller 65. The secondary transfer roller 65 secondarily transfers the multicolor toner image on the intermediate transfer belt 40 onto the sheet P (in a secondary transfer process). After the secondary transfer process, the surface of the intermediate transfer belt 40 reaches the position opposite the intermediate-transfer-belt cleaner 81. The intermediate-transfer-belt cleaner 81 collects the untransferred toner on the intermediate transfer belt 40 to complete a series of transfer processes on the intermediate transfer belt 40. The untransferred toner collected in the intermediate-transfer-belt cleaner 81 passes through the waste-toner conveyance passage and is collected as waste toner in the waste-toner container 80.

The sheet P is conveyed from the sheet feeder 61 to the position of the secondary transfer roller 65 via, for example, a registration roller pair 64. Specifically, a feed roller 62 feeds the sheet P from the top of multiple sheets P stored in the sheet feeder 61. The sheet P is conveyed to the registration roller pair 64 through a sheet conveyance passage. The sheet P that has reached the registration roller pair 64 is conveyed toward the position of the secondary transfer roller 65 so that the sheet P coincides with the arrival of the multicolor toner image on the intermediate transfer belt 40.

Subsequently, the sheet P, onto which the multicolor image is transferred, is conveyed to a fixing device 66. The fixing device 66 includes a fixing roller and a pressure roller pressing against each other. In a nip between the fixing roller and the pressure roller, the multicolor toner image is fixed on the sheet P. After the fixing process, an output roller pair 69 ejects the sheet P as an output image outside the body of the image forming apparatus 1. The ejected sheets P are stacked on an output tray 5. Thus, a series of image forming processes is completed.

Image forming devices of the image forming apparatus according to an embodiment of the present disclosure are described below in detail. The four image forming devices disposed in the body of the image forming apparatus 1 (see FIG. 1) have a similar configuration except the colors of the toner used in the image forming processes. Thus, parts of the image forming device such as the process cartridge and the developing device are illustrated without suffixes Y, M, C, and BK, which denote the colors of the toner, in the drawings.

As illustrated in FIG. 2, the process cartridge 20 typically includes the photoconductor drum 21 as the image bearer, the charging device 22, and the cleaning device 23, which are stored in a case of the process cartridge 20 as a single unit. The photoconductor drum 21 is an organic photoconductor designed to be charged with a negative polarity and includes a photosensitive layer formed on a drum-shaped conductive support. The charging device 22 is a charging roller including a conductive core and an elastic layer of moderate resistivity overlaid on the outer circumference of the conductive core. A power supply applies a specified voltage to the charging device 22 that is the charging roller, and the charging device 22 uniformly charges the surface of the photoconductor drum 21 opposite the charging device 22. The cleaning device 23 includes a cleaning blade 25*a* and a cleaning roller 25*b* that contact the photoconductor drum 21. For example, the cleaning blade 25*a* is made of rubber, such as urethane rubber, and contacts the surface of the photoconductor drum 21 at a specified angle with a specified pressure. The cleaning roller 25*b* is a brush roller in which brush bristles are provided around a core.

Figure 3:
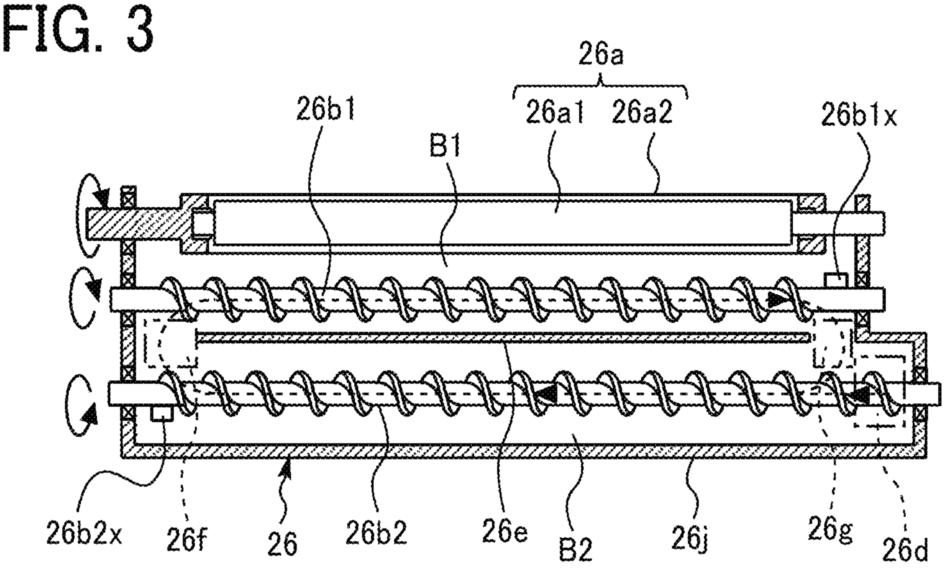
FIG. 3 is a cross-sectional view of a developing device according to an embodiment of the present disclosure, cut in a longitudinal direction of the developing device.

As illustrated in FIGS. 2 and 3, the developing device 26 typically includes a developing roller 26*a* as a developer bearer, a first conveying screw 26*b*1 as a first conveyor facing the developing roller 26*a*, a partition 26*e*, a second conveying screw 26*b*2 as a second conveyor facing the first conveying screw 26*b*1 via the partition 26*e*, and a doctor blade 26*c* as a developer regulator facing the developing roller 26*a* to regulate an amount of developer borne on the developing roller 26*a*.

The developing device 26 stores two-component developer including carrier and toner. In the present embodiment, the average particle diameter of the toner is set to about 5.2 μm, and the average particle diameter of the carrier is set to about 35 μm. In addition, the toner concentration is set to about 7 wt %, and the amount of the developer in the developing device 26 is set to about 250 g.

The developing roller 26*a* faces the photoconductor drum 21 with a small gap, thereby forming a developing area. As illustrated in FIG. 3, the developing roller 26*a* includes a magnet 26*a*1 secured inside and a sleeve 26*a*2 that rotates around the magnet 26*a*1. The magnet 26*a*1 generates multiple magnetic poles around an outer circumferential surface of the developing roller 26*a*.

Specifically, a scooping magnetic pole acts on the carrier as magnetic materials, and developer G contained in a first conveyance passage B1 (see FIG. 2) is scooped up onto a developing roller 23*a*. A part of the developer G borne on the developing roller 23*a* is scraped off at the position of the doctor blade 26*c* (see FIG. 2) and returned to the first conveyance passage B1. On the other hand, the developer G that has passed through a doctor gap between the doctor blade 26*c* and the developing roller 26*a* at the position of the doctor blade 26*c* where the magnetic force by the scooping magnetic pole acts and borne on the developing roller 26*a* stands at the position of a main magnetic pole of the multiple magnetic poles, forms a magnetic brush in the development region, and slidingly contacts the photoconductor drum 21. Thus, the toner in the developer G borne on the developing roller 26*a* adheres to the latent image formed on the photoconductor drum 21. Thereafter, the developer G that has passed through the position of the main magnetic pole is conveyed by a plurality of conveying magnetic poles to pass through a gap between the main magnetic pole and an upper developing case 26*k* (developing case), which is a casing gap W, and then is conveyed to the position of the developer releasing magnetic pole. A repulsive magnetic field (the magnetic field that acts in a direction away from the developing roller 26*a*) acts on the carrier at the position of the developer releasing magnetic pole, and the developer G borne on the developing roller 26*a* after the developing process is removed from the developing roller 26*a*. The removed developer G drops into the first conveyance passage B1 and is conveyed by the first conveying screw 26*b*1 (see FIGS. 2 and 3) toward downstream from the first conveyance passage B1.

With reference to FIGS. 2 and 3, the first conveying screw 26*b*1 and the second conveying screw 26*b*2 as conveyors convey the developer G stored inside the developing device 26 in a longitudinal direction (a width direction) of the developing device 26, thereby establishing a circulation passage indicated by a dashed arrow in FIG. 3. In other words, the first conveying screw 26*b*1 establishes the first conveyance passage B1, whereas the second conveying screw 26*b*2 establishes a second conveyance passage B2. The circulation passage of the developer includes the first conveyance passage B1 and the second conveyance passage B2. The partition 26*e* is an inner wall and separates the first conveyance passage B1 from the second conveyance passage B2. The first conveyance passage B1 and the second conveyance passage B2 communicate with each other via a first communication opening 26*f* and a second communication opening 26*g* disposed at both longitudinal ends of the first conveyance passage B1 and the second conveyance passage B2. Specifically, with reference to FIG. 3, in a conveyance direction of the developer, an upstream end of the first conveyance passage B1 communicates with a downstream end of the second conveyance passage B2 via the first communication opening 26*f*. On the other hand, in the conveyance direction of the developer, a downstream end of the first conveyance passage B1 communicates with an upstream end of the second conveyance passage B2 via the second communication opening 26*g*. In other words, the partition 26*e* is disposed along the circulation passage except both longitudinal ends of the circulation passage.

The first conveying screw 26*b*1 (or the first conveyance passage B1) is disposed to face the developing roller 26*a*. The second conveying screw 26*b*2 (or the second conveyance passage B2) is disposed to face the first conveying screw 26*b*1 (or the first conveyance passage B1) via the partition 26*e*. The first conveying screw 26*b*1 supplies developer toward the developing roller 26*a* and collects the developer separated from the developing roller 26*a* after the development process while conveying the developer in the longitudinal direction (i.e., the width direction or the axial direction) of the developing device 26. The second conveying screw 26*b*2 stirs and mixes the developer after the development process conveyed from the first conveyance passage B1 with fresh toner supplied from a toner supply inlet 26*d* while conveying the developer and the fresh toner in the longitudinal direction of the developing device 26. In the present embodiment, the two conveying screws (i.e., the first conveying screw 26*b*1 and the second conveying screw 26*b*2) are horizontally arranged in parallel. Each of the two conveying screws (i.e., the first conveying screw 26*b*1 and the second conveying screw 26*b*2) includes a shaft and a screw blade wound around the shaft.

With reference to FIG. 3, in the present embodiment, a projection 26*b*1*x* that protrudes in a radial direction from the shaft is formed at a downstream end of the first conveying screw 26*b*1 in the conveyance direction in order to accelerate delivery of the developer G to the second conveyance passage B2 via the second communication opening 26*g*. Similarly, a projection 26*b*2*x* that protrudes in a radial direction from the shaft is formed at a downstream end of the second conveying screw 26*b*2 in the conveyance direction in order to accelerate delivery of the developer G to the first conveyance passage B1 via the first communication opening 26*f*.

With reference to, for example, FIG. 2, the developing device 26 according to the present embodiment is provided with filters 26*t*1 and 26*t*2 in opening portions 26*k*1 and 26*k*2 that communicate the inside and the outside of the developing device 26 with each other. Specifically, the opening portions 26*k*1 and 26*k*2 (ventilation passages) that penetrate inside and outside of the developing device 26 are formed in a ceiling portion of the upper developing case 26*k* (developing case) of the developing device 26. The filters 26*t*1 and 26*t*2 are disposed to be fitted in the opening portions 26*k*1 and 26*k*2. The filters 26*t*1 and 26*t*2 collect the developer G (typically toner) and ventilate the developing device 26. In other words, the opening portions 26*k*1 and 26*k*2 that deliver air from the inside to the outside of the developing device 26 are formed in the upper developing case 26*k*. The filters 26*t*1 and 26*t*2 are disposed to the opening portions 26*k*1 and 26*k*2 as attachment portions. Each of the filters 26*t*1 and 26*t*2 has a structure in which fibers are entangled so that toner and carrier do not pass therethrough, and is formed so that only air can pass therethrough. A description is given of the filters 26*t*1 and 26*t*2 in more detail below with reference to, for example, FIG. 4.

The casing gap W between the upper developing case 26*k* and the developing roller 26*a* in an area downstream from the developing area in a direction of rotation of the developing roller 26*a* is set to be within a range of 0.6 to 1.0 mm. If the casing gap W is too small, the developer G borne on the developing roller 26*a* after the developing process is not smoothly conveyed to the gap W between the developing roller 26*a* and the upper developing case 26*k*. Thus, the developer G tends to overflow from the gap W and leak to the outside of the developing device 26. On the other hand, if the casing gap W is too large, the developer borne on the developing roller 26*a* is less likely to slide with and contact the inner circumferential surface of the upper developing case 26*k*, a suction air flow directed toward the inside of the developing device 26 by a pumping effect is less likely to be formed. Thus, toner scattering from the developing device 26 (toner scattering to the periphery of the developing region) tends to occur. The casing gap W is maintained in an appropriate range to reduce leakage of developer and scattering of toner. The internal pressure of the developing device 26 tends to increase by the suction air flow in the casing gap W described above. An increase of the internal pressure leads to leakage of the developer (toner scattering) from the gap of the developing device 26. To address such a situation, in the present embodiment, the upper developing case 26*k* has the opening portions 26*k*1 and 26*k*2 provided with filters 26*t* to ventilate the developing device 26 only air while collecting the toner and preventing the toner from scattering to the outside. Accordingly, the increase of the internal pressure of the developing device 26 is reduced. In other words, this configuration prevents toner scattering caused by the increase of the internal pressure of the developing device 26.

With reference to FIGS. 2 and 3, a description is given in further detail of the image forming processes described above, focusing on the development process. The developing roller 26*a* rotates in a specified direction that is counterclockwise indicated by an arrow in FIG. 2. As illustrated in FIGS. 2 and 3, the first conveying screw 26*b*1 and the second conveying screw 26*b*2 are disposed facing each other with the partition 26*e* interposed therebetween and rotate in directions indicated by arrows in FIG. 3. Toner is supplied from the toner container 70 to the toner supply inlet 26*d* (see FIGS. 3 and 4) through a toner supply passage. As the first conveying screw 26*b*1 and the second conveying screw 26*b*2 rotate in the respective directions indicated by the arrows in FIG. 2, the developer G stored in the developing device 26 circulates together with the supplied toner in the longitudinal direction of the developing device 26 (i.e., the direction indicated by the dashed arrow in FIG. 3) while being stirred and mixed with the supplied toner. The toner is charged by friction with carrier in the developer and electrostatically attracted to the carrier. Then, the toner is scooped up on the developing roller 26*a* together with the carrier by a developer scooping pole generated on the developing roller 26*a*. The developer borne on the developing roller 26*a* is conveyed in the counterclockwise direction indicated by the arrow in FIG. 2 to the position opposite the doctor blade 26*c*. The doctor blade 26*c* adjusts the amount of the developer on the developing roller 26*a* to a proper amount at the position. Subsequently, the rotation of the sleeve 26*a*2 of the developing roller 26*a* conveys the developer to the developing area in which the developing roller 26*a* faces the photoconductor drum 21. The toner in the developer is attracted to the electrostatic latent image formed on the photoconductor drum 21 due to the effect of an electric field generated in the developing area. As the sleeve 26$a$2 rotates, the developer remaining on the developing roller 26$a$ reaches above the first conveyance passage B1 and is separated from the developing roller 26$a$. The electric field in the developing area is generated by a specified voltage (in other words, a development bias) applied to the developing roller 26$a$ by a development power supply and a surface potential (in other words, a latent image potential) formed on the surface of the photoconductor drum 21 in the charging process and the exposure process.

The toner in the toner container 70 is supplied as appropriate through the toner supply passage to the developing device 26 via the toner supply inlet 26$d$ as the toner in the developing device 26 is consumed. The toner consumption in the developing device 26 is detected by a toner concentration sensor that magnetically detects a toner concentration in the developer (i.e., the proportion of the toner in the developer) in the developing device 26. The toner supply inlet 26$d$ is disposed above an end of the second conveying screw 26$b$2 (or the second conveyance passage B2) in a longitudinal direction of the second conveying screw 26$b$2 (i.e., a lateral direction in FIGS. 3 and 4).

Figure 4:
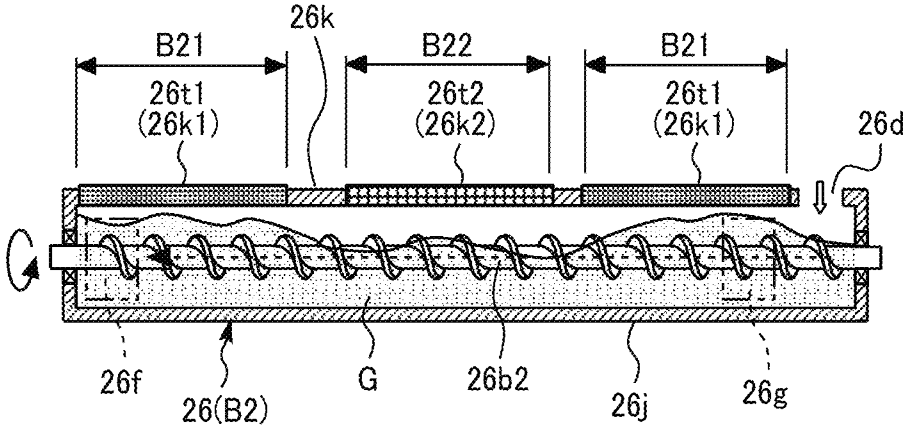
FIG. 4 is a cross-sectional view of a second conveyance passage of the developing device illustrated in FIG. 3.

The configuration and operation of the developing device 26 according to the present embodiment are described in detail below. As described above with reference to, for example, FIGS. 2 and 3, the developing device 26 according to the present embodiment is provided with a plurality of conveyance passages B1 and B2 along which the developer G stored in the developing device 26 is circulated and conveyed in the longitudinal direction. Specifically, the first conveying screw 26$b$1 is disposed in the first conveyance passage B1, and the second conveyance screw 26$b$2 is disposed in the second conveyance passage B2. As illustrated in FIGS. 2 and 4, one conveyance passage (second conveyance passage B2) of the plurality of conveyance passages B1 and B2 is provided with opening portions 26$k$1 and 26$k$2 that communicate with the outside of the developing device 26. The filters 26$t$1 and 26$t$2 are disposed so as to be fitted in the opening portions 26$k$1 and 26$k$2.

Specifically, with reference to FIG. 4, the upper developing case 26$k$ is provided with three opening portions 26$k$1 and 26$k$2 at intervals in the longitudinal direction (the left-and-right direction of FIG. 4) above the second conveyance passage B2. Specifically, the upper developing case 26$k$ is provided with first opening portions 26$k$1 in both ends in a longitudinal direction, and a second opening portion 26$k$2 in a central portion in the longitudinal direction. The opening portions 26$k$1 and 26$k$2 are substantially rectangular column-shaped through-holes formed so as to penetrate from the inside to the outside of the developing device 26.

Three filters 26$t$1 and 26$t$2 are disposed so as to be fitted in (to cover) the three opening portions 26$k$1 and 26$k$2. Specifically, first filters 26$t$1 serving as first filter portions are disposed in the first opening portions 26$k$1 at the ends in the longitudinal direction, and a second filter 26$t$2 serving as a second filter portion is disposed in the second opening portion 26$k$2 in the central portion in the longitudinal direction. Each of the filters 26$t$1 and 26$t$2 is formed in a substantially rectangular shape and has both the collecting ability to collect the developer G and the ventilation ability to ventilate the first conveyance passage B1 or the second conveyance passage B2 to the outside of the developing device 26. The "collecting ability" and the "ventilation ability" of such a filter relate to, for example, the fineness of the mesh and are in a mutually contradictory relation. In other words, the relations are established in which when the "collecting ability" of the filter is enhanced, the "ventilation ability" deteriorates, and when the "ventilation ability" is enhanced, the "collecting ability" deteriorates.

In the second conveyance passage B2 (one conveyance passage), the filters 26$t$1 and 26$t$2 according to the present embodiment are formed such that the collecting ability of a high-bulk portion B21 in which the bulk of the developer G becomes high is higher than the collecting ability of the low-bulk portion B22 in which the bulk of the developer G becomes low, and the ventilation ability of the high-bulk portion B21 is lower than the ventilation ability of the low-bulk portion B22.

Specifically, as illustrated in FIG. 4, in the second conveyance passage B2 (one conveyance passage), the high-bulk portions B21 are located at both end portions of the second conveyance passage B2 in the longitudinal direction, and the low-bulk portion B22 is located in the central portion of the second conveyance passage B2 in the longitudinal direction. This is because the second conveyance passage B2 (one conveyance passage) is provided with the communication openings 26$f$ and 26$g$ that communicate with another adjacent conveyance passage (which is the first conveyance passage B1) at both end portions of the second conveyance passage B2 in the longitudinal direction. In the vicinity (one end of the second conveyance passage B2 in the longitudinal direction) of the second communication opening 26$g$ in the second conveyance passage B2, the developer G flows in (is delivered to) from the first conveyance passage B1, and thus the flow of the developer G becomes worse and the bulk (height of the surface) of the developer G becomes higher. In particular, as described above with reference to FIG. 3, the projection 26$b$1$x$ is formed at the downstream end of the first conveying screw 26$b$1 in the conveyance direction so as to protrude in the radial direction from the shaft in order to accelerate delivery of the developer G to the second conveyance passage B2 via the second communication opening 26$g$. Accordingly, such a phenomenon is likely to occur. In the second conveyance passage B2 (one conveyance passage), the toner supply inlet 26$d$ from which toner is supplied is formed in the vicinity of the longitudinal end (right end in FIG. 4) corresponding to an upstream side in the conveyance direction of the developer G, and thus the bulk of the developer G increases in the vicinity of the second communication opening 26$g$ by the amount of toner supplied from the toner supply inlet 26$d$. In the vicinity of the first communication opening 26$f$ (the other end of the second conveyance passage B2 in the longitudinal direction) in the second conveyance passage B2, the developer G conveyed by the second conveying screw 26$b$2 is likely to accumulate, and the bulk (height of the surface) of the developer G increases. As described above with reference to FIG. 3, the projection 26$b$2$x$ that protrudes in the radial direction from the shaft is formed at the downstream end of the second conveying screw 26$b$2 in the conveyance direction of the developer G in order to accelerate the delivery of the developer G to the first conveyance passage B1 via the first communication opening 26$f$. However, in the above-described case, the bulk of the developer G becomes high on the downstream side of the second conveyance passage B2. On the other hand, the central portion of the second conveyance passage B2 in the longitudinal direction does not have a factor that impairs the flow of the developer G as in the ends in the longitudinal direction, and thus the bulk (height of the surface) of the developer G decreases due to the conveyance of the developer G by the second conveying screw 26$b$2. For this reason, the developer G approaches the ceiling surface (filter) of the upper developing case 26$k$ in the high-bulk portions B21 of the longitudinal ends as compared with the low-bulk portion B22 of the central portion in the longitudinal direction.

In the present embodiment, the first filter **26*t*1 having a higher collecting ability and a lower ventilation ability than the second filter 26*t*2 is used. The first filter 26*t*1 formed as such is disposed in each of the high-bulk portions B21 at the ends in the longitudinal direction. At the high-bulk portion B21, the developer G approaches the ceiling surface (filter 26*t*1) of the upper developing case 26*k*. Thus, the developer G that flies (jumps) upward by the rotation of the second conveying screw 26*b*2 is likely to directly hit the filter 26*t*1. Accordingly, if a filter having a low collecting ability for the developer G is used as the first filter 26*t*1 disposed in the high-bulk portion B21, the developer G that cannot be collected by the first filter 26*t*1 leaks to the outside of the developing device 26. On the other hand, in the present embodiment, a filter having a high collecting ability for the developer G is used as the first filter 26*t*1 disposed in the high-bulk portion B21, and thus the leakage of the developer G from the high-bulk portion B21** can be reduced.

On the other hand, the second filter **26*t*2 having a lower collecting ability and a higher ventilation ability than the first filter 26*t*1 is used. The second filter 26*t*2 formed as such is disposed on the low-bulk portion B22 at the central portion in the longitudinal direction. At the low-bulk portion B22, the developer G does not approach the ceiling surface (filter 26*t*2) of the upper developing case 26*k* as the high-bulk portion B21. Thus, a phenomenon in which the developer G flies (jumps) upward by rotation of the second conveying screw 26*b*2 is not likely to occur. Accordingly, a filter having a low collecting ability for the developer G but having a high ventilation ability on the contrary is used as the second filter 26*t*2 disposed in the low-bulk portion B22. The first filter 26*t*1 having a high collecting ability but a low ventilation ability is used in the high-bulk portion B21. If the second filter 26*t*2 also having substantially the same characteristics is used, the ventilation ability of the second conveyance passage B2 becomes low as a whole. Thus, an increase in the internal pressure of the developing device 26 is not prevented, and toner scattering may occur. On the other hand, in the present embodiment, since a filter having a high ventilation ability is used as the second filter 26*t*2 disposed in the low-bulk portion B22, the low ventilation ability of the high-bulk portion B21 is complemented. Thus, an increase of the internal pressure of the developing device 26** is restricted as a whole, and toner scattering is less likely to occur.

As described above, the filters **26*t*1 and 26*t*2 according to the present embodiment are formed such that the collecting ability of the high-bulk portion B21 is higher than the collecting ability of the low-bulk portion B22, and the ventilation ability of the high-bulk portion B21 is lower than the ventilation ability of the low-bulk portion B22 in the second conveyance passage B2. Accordingly, the function of the filters 26*t*1 and 26*t*2 can be fully performed in the longitudinal direction. The filters 26*t*1 and 26*t*2 can effectively prevent leakage of the developer G to the outside of the developing device 26 while effectively reducing an increase of the internal pressure of the developing device 26. In particular, in the developing device 26 according to the present embodiment, the ceiling surface of the upper developing case 26*k* is set at a low position in the first conveyance passages B1 and the second conveyance passages B2 in order to reduce the size of the developing device 26. Accordingly, the developer G is likely to contact the filter 26*t*1 disposed in the high-bulk portion B21**. As a result, the configuration of the present disclosure is useful.

First Modification

Figure 5:
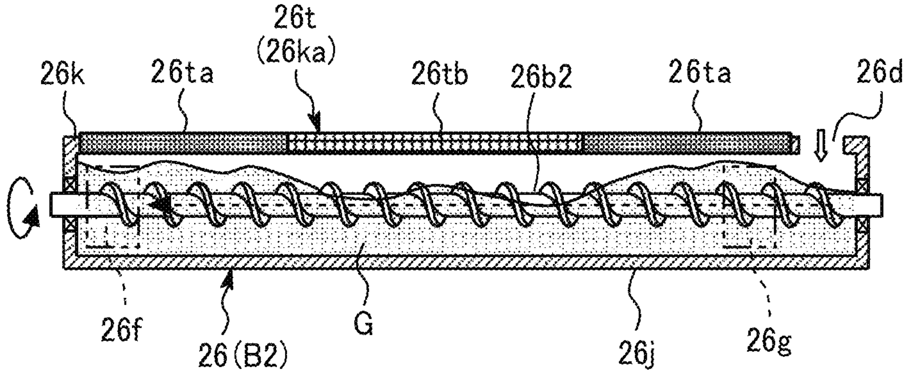
FIG. 5 is a cross-sectional view of a second conveyance passage of a developing device according to a first modification of an embodiment of the present disclosure.

As illustrated in FIG. 5, in a developing device 26 according to a first modification of the present embodiment, an upper developing case **26*k* that covers an upper portion of a second conveyance passage B1 has one opening portion 26*ka* rather than three opening portions 26*k*1 and 26*k*2. The opening portion 26*ka* extends in a longitudinal direction of the upper developing case 26*k*. One filter 26*t* is disposed to cover the one opening portion 26*ka*. The filter 26*t* is provided with a high-density portion 26*ta* in each of both ends of the filter 26*t* in the longitudinal direction, and a low-density portion 26*tb* in the central portion in the longitudinal direction. The high-density portion 26*ta* has a higher collecting ability and a lower ventilation ability than the low-density portion 26*tb*. On the other hand, the low-density portion 26*tb* has a lower collecting ability and a higher ventilation ability than the high-density portion 26*ta*. Also in the case of such a configuration, the function of the filter 26*t* can be fully performed in the developing device 26** in the longitudinal direction.

Second Modification

Figure 6:
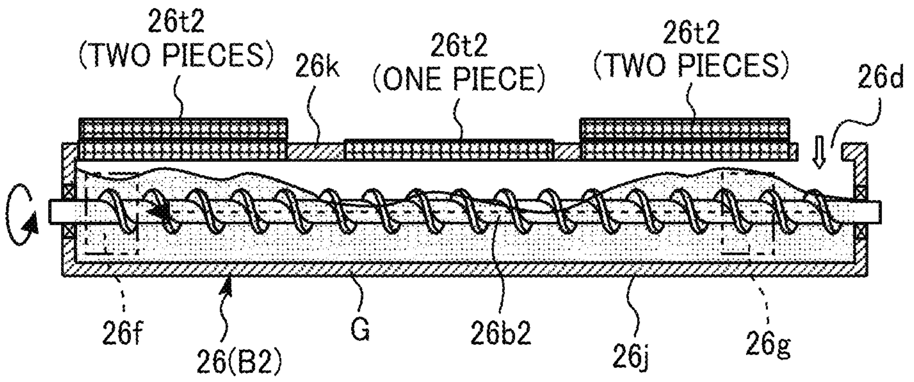
FIG. 6 is a cross-sectional view of a second conveyance passage of a developing device according to a second modification of an embodiment of the present disclosure.

As illustrated in FIG. 6, a developing device 26 according to a second modification of the present embodiment uses a plurality of filters **26*t*2 of the same type (second filters 26*t*2 in the present modification) as filters. The number of filters of the same type (the second filter 26*t*2) stacked in the high-bulk portion B21 is greater than the number of filters of the same type (the second filter 26*t*2) stacked in the low-bulk portion B22. Specifically, in the present embodiment described with reference to FIG. 6, two second filters 26*t*2 are disposed in each of the first opening portions 26*k*1 corresponding to the high-bulk portions B21 at both ends in the longitudinal direction such that the two second filters 26*t*2 are stacked in the vertical direction (the direction in which ventilation is performed) to enhance the collecting ability instead of lowering the ventilation ability. On the other hand, one second filter 26*t*2 is disposed in the second opening portion 26*k*2 corresponding to the low-bulk portion B22 at the central portion in the longitudinal direction to enhance the ventilation ability instead of lowering the collecting ability. Also in the case of such a configuration, the function of the filter 26*t* can be fully performed in the developing device 26** in the longitudinal direction.

Third Modification

Figure 7:
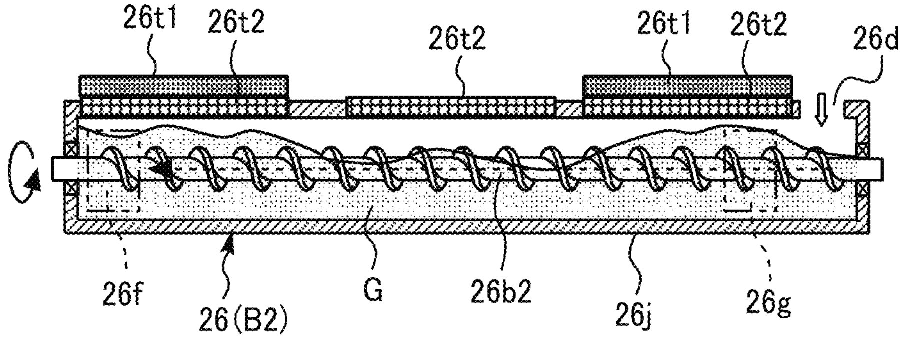
FIG. 7 is a cross-sectional view of a second conveyance passage of a developing device according to a third modification of an embodiment of the present disclosure.

As illustrated in FIG. 7, a developing device 26 according to a third modification of the present embodiment uses, as filters, a plurality of types of filters (a first filter **26*t*1 and a second filter 26*t*2 in the present modification) having different collecting abilities and ventilation abilities. The type, number, and order of filters to be stacked in a high-bulk portion B21 among the plurality of types of filters 26*t*1 and 26*t*2 are different from the type, number, and order of filters to be disposed in a low-bulk portion B22 among the plurality of types of filters 26*t*1 and 26*t*2. Specifically, in the present embodiment described with reference to FIG. 7, a second filter 26*t*2 is disposed to be stacked on the first filter 26*t*1 in each of the first opening portions 26*k*1 corresponding to the high-bulk portions B21 at both ends in the longitudinal direction, so that the collecting ability is increased instead of lowering the ventilation ability. In particular, when the first filter 26*t*1 and the second filter 26*t*2 having different characteristics are stacked in this order, the ventilation ability of the lower layer (the second filter 26*t*2) is ensured to some extent until the collection of the developer G proceeds in the upper layer (the first filter 26*t*1). On the other hand, one second filter 26*t*2 is disposed in the second opening portion 26*k*2 corresponding to the low-bulk portion B22 at the central portion in the longitudinal direction to enhance the ventilation ability instead of lowering the collecting ability. Also in the case of such a configuration, the function of the filter 26*t* can be fully performed in the developing device 26** in the longitudinal direction.

Fourth Modification

Figure 8:
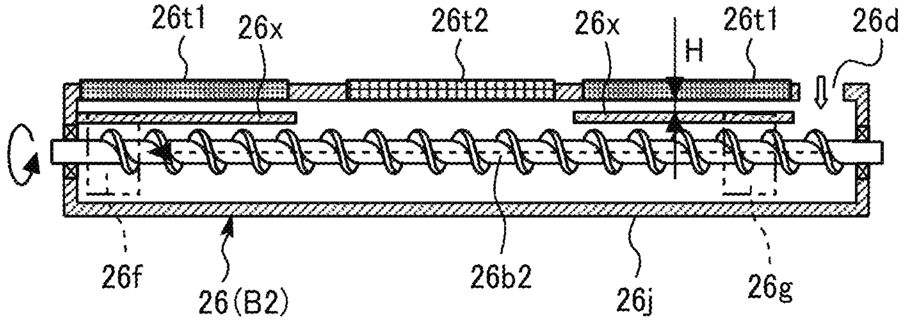
FIG. 8 is a cross-sectional view of a second conveyance passage of a developing device according to a fourth modification of an embodiment of the present disclosure.

As illustrated in FIG. 8, in a developing device 26 according to a fourth modification of the present embodiment, a restrictor **26*x* is disposed at a high-bulk portion B21 in a second conveyance passage B2 (one conveyance passage) to restrict flying of developer G directly toward a first filter 26*t*1. Specifically, an eave-shaped restrictor 26*x* that covers a lower portion of a first opening portion 26*k*1 (the first filter 26*t*1) is formed at each of both ends of a lower developing case 26*j* in the longitudinal direction in the second conveyance passage B2. Accordingly, the developer G splashed by a second conveying screw 26*b*2 is not likely to directly contact the first filter 26*t*1, and thus an inconvenience that the first filter 26*t*1 is clogged with the developer G is not likely to occur. In the present modification, a clearance H is formed between the restrictor 26*x* and the first filter 26*t*1. As a result, the ventilation ability by the first filter 26*t*1 is ensured as compared with a case where the clearance H is not formed. Also in the case of such a configuration, the function of the filter 26*t* can be fully performed in the developing device 26** in the longitudinal direction.

As described above, the developing device 26 in the present embodiment is a developing device that develops a latent image formed on the surface of the photoconductor drum 21 (image bearer). The developing device 26 includes the plurality of conveyance passages B1 and B2 that circulate and convey the developer G stored inside the developing device 26 in the longitudinal direction. The opening portions **26*k*1 and 26*k*2 that communicate with the outside of the developing device 26 are formed in one conveyance passage B2 among the plurality of conveyance passages B1 and B2. The filters 26*t*1 and 26*t*2 having both the collecting ability to collect the developer G and the ventilation ability to ventilate the first conveyance passage B1 or the second conveyance passage B2 to the outside of the developing device 26 are disposed to be fitted in the opening portions 26*k*1 and 26*k*2. In the second conveyance passage B2 (one conveyance passage), the filters 26*t*1 and 26*t*2 according to the present embodiment are formed such that the collecting ability of the high-bulk portion B21 in which the bulk of the developer G becomes high is higher than the collecting ability of the low-bulk portion B22 in which the bulk of the developer G becomes low, and the ventilation ability of the high-bulk portion B21 is lower than the ventilation ability of the low-bulk portion B22. As a result, the function of the filters 26*t*1 and 26*t*2 can be fully performed in the developing device 26** in the longitudinal direction.

In the present embodiment, the process cartridge 20 does not include the developing device 26. The developing device 26 is a unit that is independently attachable to and removable from the body of the image forming apparatus 1. Alternatively, the developing device 26 may be one of the constituent elements of the process cartridge 20. In this case, the process cartridge 20 including the developing device 26 as an integral part is attachable to and removable from the body of the image forming apparatus 1. In such a configuration, similar effects to those of the present embodiment are also attained. The term "process cartridge" used in the present disclosure is defined as a unit that unites an image bearer and at least one of a charging device to charge the image bearer, a developing device to develop a latent image on the image bearer, and a cleaning device to clean the image bearer and that is attachable to and removable from the body of the image forming apparatus.

In the present embodiment, the developing device 26 includes the two conveyance passages B1 and B2 (i.e., the first conveying screw **26*b*1 and the second conveying screw 26*b*2) as the conveyors horizontally arranged in parallel and the doctor blade 26*c* disposed below the developing roller 26*a*. The configuration of the developing device is not limited to the above-described configuration. In the developing device according to one or more embodiments of the present disclosure, three or more conveyance passages may be horizontally arranged in parallel, multiple conveyance passages may be arranged in parallel in the vertical direction, or the doctor blade may be disposed above the developing roller. In the present embodiment, the developing device 26 stores the two-component developer including toner and carrier. Alternatively, according to one or more embodiments of the present disclosure, the developing device may store one-component developer (i.e., toner, which may include additives). In the developing device including the one component developer, a developing roller as the developer bearer may be in contact with the photoconductor drum as the image bearer and may form a developing region. In the present embodiment, the present disclosure has been applied to the developing device 26 in which the opening portions (the first opening portion 26*k*1 and the second opening portion 26*k*2) and the filters 26*t*1 and 26*t*2 (the first filter 26*t*1 and the second filter 26*t*2) are provided above the second conveyance passage B2 among the two conveyance passages (the first conveyance passage B1 and the second conveyance passage B2). The configuration of the developing device to which the present disclosure is applied is not limited thereto. The present disclosure is also applicable to, for example, a developing device in which an opening portion and a filter are provided at a side (the position not buried in the developer G) of the second conveyance passage B2, a developing device in which an opening portion and a filter are provided above the first conveyance passage B1**. Such a case can also provide similar effects to those of the present embodiment.

Note that embodiments of the present disclosure are not limited to the above-described embodiments and it is apparent that the above-described embodiments can be appropriately modified within the scope of the technical idea of the present disclosure in addition to what is suggested in the above-described embodiments. Further, features of components of the embodiments, such as the number, the position, and the shape are not limited to the embodiments and thus may be preferably set to be applied to the present disclosure.

Aspects of the present disclosure may be, for example, combinations of first to tenth aspects as follows.

First Aspect

A developing device (e.g., the developing device 26) that develops a latent image formed on a surface of an image bearer (e.g., the photoconductor drum 21). The developing device includes a plurality of conveyance passages (e.g., the first conveyance passage B1 and the second conveyance passage B2), an opening portion (e.g., the first opening portion 26k1 or the second opening portion 26k2), and a filter (e.g., the filter 26t). Developer (e.g., the developer G) stored in the developing device is circulated and conveyed in a longitudinal direction in the plurality of conveyance passages. The opening portion is formed in one conveyance passage (e.g., the first conveyance passage B1 or the second conveyance passage B2) of the plurality of conveyance passages and communicates with an outside of the developing device. The filter is disposed to be fitted in the opening portion and has both a collecting ability to collect the developer and a ventilation ability to ventilate the one conveyance passage to the outside of the developing device. The filter is formed such that the collecting ability of a high-bulk portion (e.g., the high-bulk portion B21) in which bulk of the developer increases in the one conveyance passage is higher than the collecting ability of a low-bulk portion (e.g., the low-bulk portion B22) in which bulk of the developer decreases, and the ventilation ability of the high-bulk portion is lower than the ventilation ability of the low-bulk portion.

Second Aspect

In the developing device (e.g., the developing device 26) according to the first aspect, the one conveyance passage (e.g., the first conveyance passage B1 or the second conveyance passage B2) is provided with communication openings (e.g., the first communication opening 26f and the second communication opening 26g) that communicate with the other adjacent conveyance passage at both end portions of the conveyance passage in the longitudinal direction. The high-bulk portions (e.g., the high-bulk portion B21) correspond to the both end portions of the conveyance passage in the longitudinal direction and the low-bulk portion (e.g., the low-bulk portion B22) correspond to a central portion of the conveyance passage in the longitudinal direction.

Third Aspect

The developing device (e.g., the developing device 26) according to the first or second aspect, the one conveyance passage (e.g., the first conveyance passage B1 or the second conveyance passage B2) is provided with a toner supply inlet (e.g., the toner supply inlet 26d) through which toner is supplied is formed adjacent to one end of the one conveyance passage in the longitudinal direction, and the one end of the one conveyance passage in the longitudinal direction corresponds to an upstream end of the one conveyance passage in a direction in which the developer (e.g., the developer G) is conveyed.

Fourth Aspect

The developing device (e.g., the developing device 26) according to any one of the first to third aspect, the filter (e.g., the filter 26t) includes a first filter (e.g., the first filter 26t1 serving as a first filter portion) and a second filter (e.g., the second filter 26t2 serving as a second filter portion). The second filter has a lower collecting ability and a higher ventilation ability compared to the first filter. The first filter is disposed to the high-bulk portion (e.g., the high-bulk portion B21), and the second filter is disposed to the low-bulk portion (e.g., the low-bulk portion B22).

Fifth Aspect

The developing device (e.g., the developing device 26) according to any one of the first to third aspects, the filter (e.g., the filter 26t) includes a plurality of types of filters (e.g., the first filter 26t1, the second filter 26t2) of same type. A number of the filters of the same type to be stacked in the high-bulk portion (e.g., the high-bulk portion B21) is greater than a number of the filters of the same type to be stacked in the low-bulk portion (e.g., the low-bulk portion B22).

Sixth Aspect

The developing device (e.g., the developing device 26) according to any one of the first to third aspects, the filter (e.g., the filter 26t) includes a plurality of types of filters (e.g., the first filter 26t1, the second filter 26t2) having different collecting ability and different ventilation ability. A type and a number of filters (e.g., the first filter 26t1, the second filter 26t2) to be disposed and an order of stacking in the high-bulk portion (e.g., the high-bulk portion B21), and a type and a number of filters to be disposed and an order of stacking in the low-bulk portion (e.g., the low-bulk portion B22), are different from each other.

Seventh Aspect

The developing device (e.g., the developing device 26) according to any one of the first to sixth aspects, the one conveyance passage (e.g., the first conveyance passage B1 or the second conveyance passage B2) includes a restrictor (e.g., the restrictor 26x) that restricts flying of the developer (e.g., the developer G) directly toward the filter (e.g., the filter 26t) in the high-bulk portion (e.g., the high-bulk portion B21).

Eighth Aspect

The developing device (e.g., the developing device 26) according to the seventh aspect, a clearance (e.g., the clearance H) is formed between the restrictor (e.g., the restrictor 26x) and the filter (e.g., the filter 26t).

Ninth Aspect

A process cartridge (e.g., the process cartridge 20) that is detachably attached to a body of an image forming apparatus (e.g., the image forming apparatus 1). The process cartridge includes the developing device (e.g., the developing device 26) according to any one of the first to eighth aspects and the image bearer (e.g., the photoconductor drum 21) as an integrated unit.

Tenth Aspect

An image forming apparatus (e.g., the image forming apparatus 1) includes the developing device (e.g., the developing device 26) according to any one of the first to eighth aspects.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The invention claimed is:

1. A developing device to develop a latent image formed on a surface of an image bearer, the developing device comprising:

a plurality of conveyance passages in which developer stored in the developing device is circulated and is conveyed in a longitudinal direction of the developing device;

an opening portion disposed in one conveyance passage of the plurality of conveyance passages, the opening portion communicating with an outside of the developing device; and a filter fitted in the opening portion, the filter having both a collecting ability to collect the developer and a ventilation ability to ventilate the one conveyance passage to the outside of the developing device, wherein the collecting ability of the filter is higher in a high-bulk portion in which bulk of the developer increases in the one conveyance passage than in a low-bulk portion in which the bulk of the developer decreases in the one conveyance passage, and wherein the ventilation ability of the filter is lower in the high-bulk portion than in the low-bulk portion.

2. The developing device according to claim 1, wherein the one conveyance passage is provided with communication openings at both end portions of the one conveyance passage in the longitudinal direction, the communication openings communicating with another conveyance passage of the plurality of conveyance passages, said another conveyance passage being adjacent to the one conveyance passage, and wherein the high-bulk portion and another high-bulk portion in which the bulk of the developer increases in the one conveyance passage correspond to both end portions of the one conveyance passage in the longitudinal direction and the low-bulk portion corresponds to a central portion of the one conveyance passage in the longitudinal direction.

3. The developing device according to claim 2, wherein the one conveyance passage is provided with a toner supply inlet through which toner is supplied, the toner supply inlet is disposed adjacent to one end of the one conveyance passage in the longitudinal direction, and the one end of the one conveyance passage in the longitudinal direction corresponds to an upstream end of the one conveyance passage in a direction in which the developer is conveyed.

4. The developing device according to claim 1, wherein the filter includes a first filter portion and a second filter portion, wherein the second filter portion is lower in the collecting ability and higher in the ventilation ability than the first filter portion, and wherein the first filter portion is disposed in the high-bulk portion, and the second filter portion is disposed in the low-bulk portion.

5. The developing device according to claim 1, wherein the filter includes a plurality of filter portions of a same type, and wherein, of the plurality of filter portions of the same type, a number of filter portions stacked in the high-bulk portion is greater than a number of filter portions stacked in the low-bulk portion.

6. The developing device according to claim 1, wherein the filter includes a plurality of types of filter portions different in the collecting ability and the ventilation ability, and wherein, of the plurality of types of filter portions, a type, a number, and a stacking order of filter portions stacked in the high-bulk portion is different from a type, a number, and a stacking order of filter portions stacked in the low-bulk portion.

7. The developing device according to claim 1, wherein the one conveyance passage includes a restrictor that restricts the developer from directly flying toward the filter in the high-bulk portion.

8. The developing device according to claim 7, wherein a clearance is between the restrictor and the filter.

9. A process cartridge that is detachably attached to a body of an image forming apparatus, the process cartridge comprising:

the developing device according to claim 1; and the image bearer united with the developing device.

10. An image forming apparatus comprising the developing device according to claim 1.

* * * * *